(12) United States Patent
Gabriel et al.

(10) Patent No.: US 8,365,260 B2
(45) Date of Patent: Jan. 29, 2013

(54) MULTI-VARIABLE CHALLENGE AND RESPONSE FOR CONTENT SECURITY

(75) Inventors: Logan S. Gabriel, Raleigh, NC (US); Jeffrey R. Hamilton, Pittsboro, NC (US); Jonathan B. Russell, Research Triangle Park, NC (US)

(73) Assignee: International Business Machines Corporation, Armonk, NY (US)

(*) Notice: Subject to any disclaimer, the term of this patent is extended or adjusted under 35 U.S.C. 154(b) by 663 days.

(21) Appl. No.: 12/567,260

(22) Filed: Sep. 25, 2009

(65) Prior Publication Data

US 2011/0078778 A1    Mar. 31, 2011

(51) Int. Cl.
    *G06F 17/30* (2006.01)
(52) U.S. Cl. ............ 726/5; 726/3; 726/2; 713/184; 713/182
(58) Field of Classification Search .................. None
    See application file for complete search history.

(56) References Cited

U.S. PATENT DOCUMENTS

| | | | | |
|---|---|---|---|---|
| 7,188,314 B2* | 3/2007 | Mizrah | ............ | 715/741 |
| 2007/0124595 A1 | 5/2007 | Carter et al. | | |
| 2007/0179905 A1 | 8/2007 | Buch et al. | | |
| 2010/0251388 A1* | 9/2010 | Dorfman | ............ | 726/29 |

OTHER PUBLICATIONS

IP.com; Technical Disclosure No. IPCOM000178914D; Jan. 29, 2009; www.ip.com/pubview/IPCOM000178914D.

* cited by examiner

*Primary Examiner* — Pramila Parthasarathy
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for multi-variable challenge-response. In an embodiment of the invention, a method for multi-variable challenge-response can include receiving a request to access content from an end user computing device from over a computer communications network. The method also can include selecting different objects for inclusion in an object set and applying a different characteristic to each of the different objects in the object set. A question and answer can be generated based upon each of the different characteristics. Further, a challenge-response prompt can be transmitted to the end user computing device such that the prompt includes the different objects with different characteristics applied, and also the generated question. A response to the challenge-response prompt can be received and compared the response to the computed answer. Finally, access to the content can be granted if the response and computed answer match, but otherwise access to the content can be denied.

16 Claims, 3 Drawing Sheets

MULTI-VARIABLE CHALLENGE AND RESPONSE FOR CONTENT SECURITY

BACKGROUND OF THE INVENTION

1. Field of the Invention

The present invention relates to the field of secure computing and more particularly to computer-human differentiation in secure computing.

2. Description of the Related Art

The advent of network computing and the global Internet has provided vast new opportunities for information sharing not previously possible. The global Internet in particular provides a vehicle through which unimaginable volumes of content can be shared with the public without regard to the geographic distance separating content publisher from content consumer. Notwithstanding, the availability of the widespread dissemination of content over the global Internet is not without consequence. In this regard, the use of the global Internet to distribute content often relies upon the good faith of content consumers that all will consume content on a fair and equal basis. Automated logic, however, can skew content consumption in favor of automated mechanisms at the expense of human consumers.

Specifically, bot technology permits rapid and repeated access to content at a pace orders of magnitude greater than a human end-user. In consequence, malicious agents can defeat the intent of content publishers publishing content intended for consumption by human end-users at a pace expected only of a human end user. The net result can include the over consumption of resources of the content provider and the unauthorized mining of content for purposes not authorized by the content provider.

To defeat the operation of bot technology accessing content intended for direct human consumption, various forms of reverse Turing tests have been contrived including tailored challenge-response tests. "CAPTCHA" is one such well-known challenge-response test in which the content publisher (or its proxy) challenges an end-user to state text rendered in a distorted manner within an image. Presumably, an automated process cannot recognize the text due to its distortion. Yet, a human end user can adequately recognize the text and respond in kin in a minimally burdensome manner. Thus, CAPTCHA aids in differentiating a computer response from a human response.

CAPTCHA technologies such as that described in U.S. Patent Application Publication US 2007/0124595 by Carter et al. (Carter) for METHOD, SYSTEM AND COMPUTER PROGRAM PRODUCT FOR ACCESS CONTROL, provide for the advanced ability of dynamically selecting CAPTHCA images for display during an access control process to add a layer of complexity in the CAPTCHA process. For example, as described in Carter, an image for CAPTCHA can be generated according to provided meta-data—namely image attributes—such as a gender of an image of a person, or a dimensionality of a shape. Using the meta-data, the CAPTCHA image can be produced and used during the access control process.

Of note, alternatives to CAPTCHA include prompting end users to engage in manually interactive processes such as drawing with a pointing device about a designated region of a display screen or display element. A well-known alternative common to the financial services industry includes presenting to an end user a series of pictures that are to be selected in accordance with an associated keyword. In all circumstances, however, a reasonable probability remains that an automated bot can correctly "guess" a response to a challenge to defeat the intent of the challenge-response exercise. Even still, to reduce the probability of a correct guess to a challenge-response exercise can frustrate the end user with an overly complicated process.

BRIEF SUMMARY OF THE INVENTION

Embodiments of the present invention address deficiencies of the art in respect to challenge-response processes and provide a novel and non-obvious method, system and computer program product for multi-variable challenge-response. In an embodiment of the invention, a method for multi-variable challenge-response can include receiving a request to access content from an end user computing device from over a computer communications network. The method also can include selecting different objects for inclusion in an object set and applying multiple different characteristics to the different objects in the object set. A question can be generated based upon the multiple different characteristics and computing an answer to the question. Further, a challenge-response prompt can be transmitted to the end user computing device such that the prompt includes the different objects with multiple different characteristics applied, and also the generated question. A response to the challenge-response prompt can be received and compared the response to the computed answer. Finally, access to the content can be granted if the response and computed answer match, but otherwise access to the content can be denied.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for multi-variable challenge-response. In accordance with an embodiment of the present invention, a challenge-response prompt can be generated to include multiple different objects in an object. Each object can include multiple different variable characteristics. Examples include different colors, patterns and shape features. Other examples include different decorators disposed in proximity to different shape features of the objects in the object set such as different iconic images, different text or both. A question can be generated based upon the multiple different variable characteristics and an answer can be computed for the question. Thereafter, the prompt can be transmitted to an end user device requesting access to content and access can be granted only when a response to the prompt matches the computed answer.

Figure 1A:
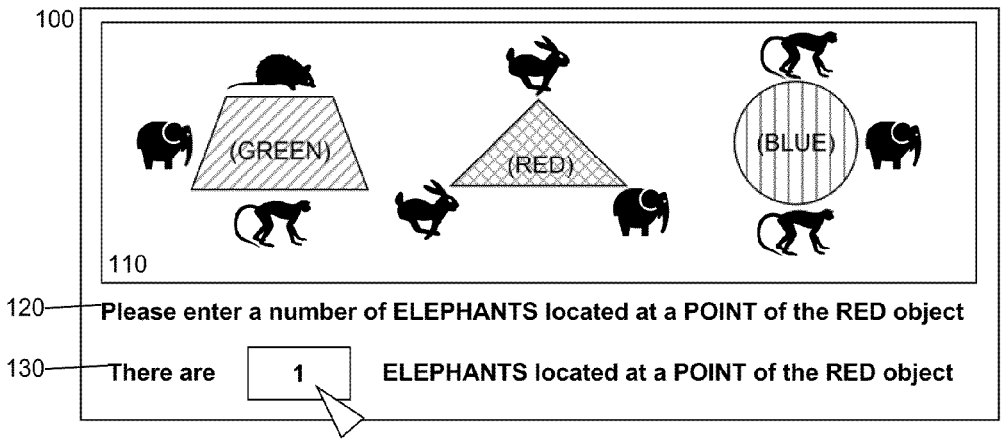
FIGS. 1A through 1D, taken together, are a pictorial illustration of a multi-variable challenge response user interface.

In further illustration, FIGS. 1A through 1D, taken together, pictorially show different examples of a multi-variable challenge response user interface. FIG. 1A, for instance, shows a challenge-response prompt 100 incorporating an object set 110 of different shapes. Each of the shapes can include multiple different characteristics—namely different colors (green, red and blue), different shape features (points and arcs) and different decorators in the form of different iconic images (animals). A question 120 is provided accounting for the different characteristics ("Please enter a number of ELEPHANTS located at a POINT of the RED object"). Thus, the question 120 can include different variables—an animal type for a decorator, a shape feature, and a color. An answer field 130 can be provided to receive an answer to the question.

Figure 1B:
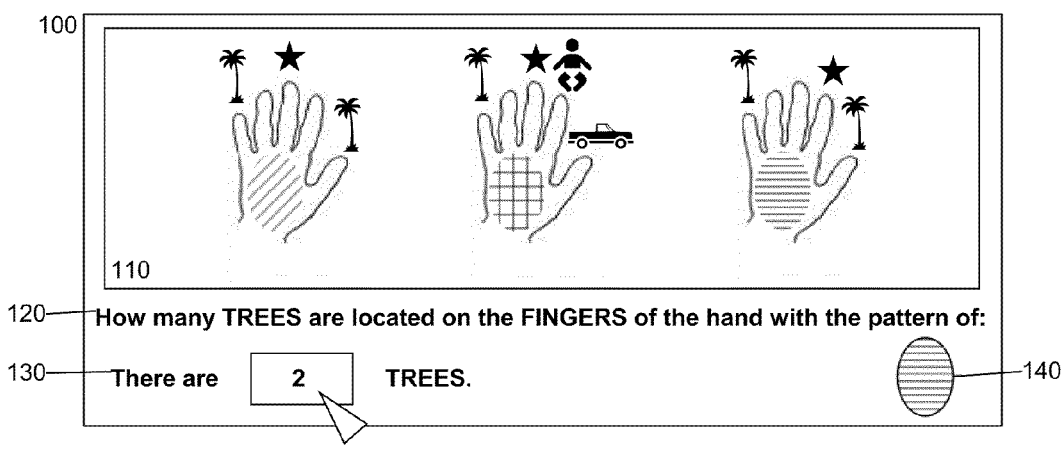

As another example, FIG. 1B shows a challenge-response prompt 100 incorporating an object set 110 of different hand images. Each hand image can include multiple different characteristics—namely different patterns (hatched, cross-haired and lined), different shape features (fingers) and different decorators in the form of different iconic images (trees, stars, babies and trucks). A question 120 is provided accounting for the different characteristics ("How many TREES are located on the FINGERS of the hand with the pattern of:" and a pattern image 140 can be presented in proximity to the object set 110. An answer field 130 also can be provided to receive an answer to the question.

Figure 1C:
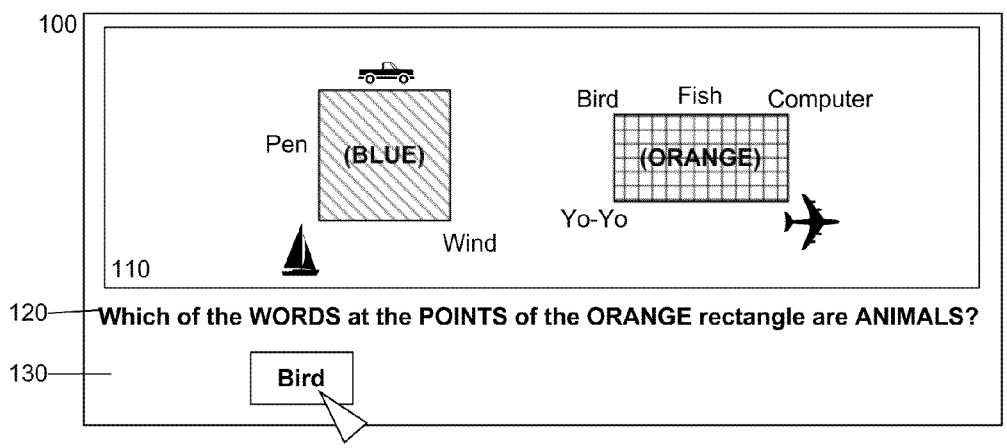

As yet another example, FIG. 1C shows a challenge-response prompt 100 incorporating an object set 110 of different shapes. Each shape can include multiple different characteristics—namely different colors (blue, orange), different shape features (points) and different decorators in the form of both different iconic images (boats, planes and trucks) and text (Pen, Wind, Bird, Yo-Yo, Fish, Computer). A question 120 is provided accounting for the different characteristics ("Which of the WORDS at the POINTS of the ORANGE rectangle are ANIMALS". As before, an answer field 130 also can be provided to receive an answer to the question. Alternatively, an end user can use a user interface device such as a mouse pointer to select one or more shapes in the object set 110 as an answer to the question 120.

Figure 1D:
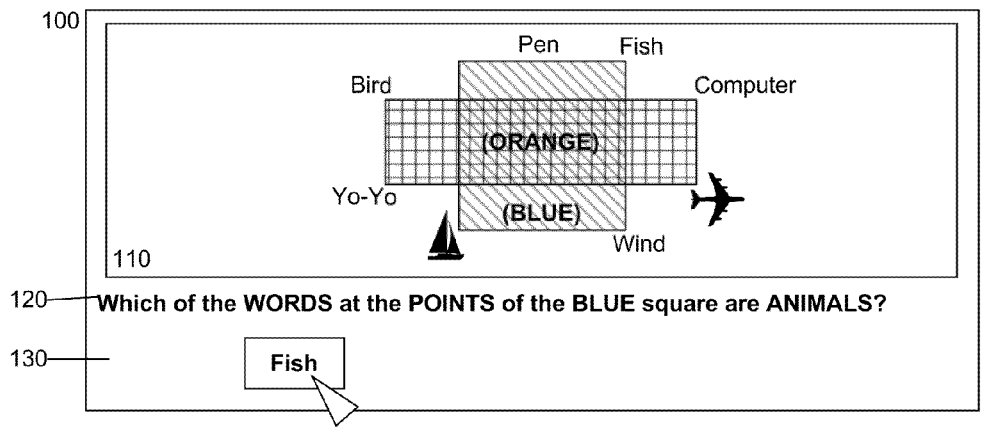

Finally, as even yet another example, FIG. 1D shows a challenge-response prompt 100 incorporating an object set 110 of different shapes. Each shape can include multiple different characteristics—namely different colors (blue, orange), different shape features (points) and different decorators in the form of both different iconic images (boats and planes) and text (Pen, Wind, Bird, Yo-Yo, Fish, Computer). Of note, the shapes of the object set 110 can be overlain atop one another to provide further image distortion for a bot while remaining intelligible to a human end user. A question 120 is provided accounting for the different characteristics ("Which of the WORDS at the POINTS of the BLUE square are ANIMALS". As before, an answer field 130 also can be provided to receive an answer to the question.

It is to be recognized by the skilled artisan that substantially different challenge-response prompts can be crafted within the spirit of the invention as described herein. In this regard, the different challenge-response prompts can be crafted to include multiple different variables evident from object sets upon which a question can be generated to incorporate the multiple different variables. Examples include an object-set of three-dimensional images, or a three-dimensional image of different objects in the object set.

Figure 2:
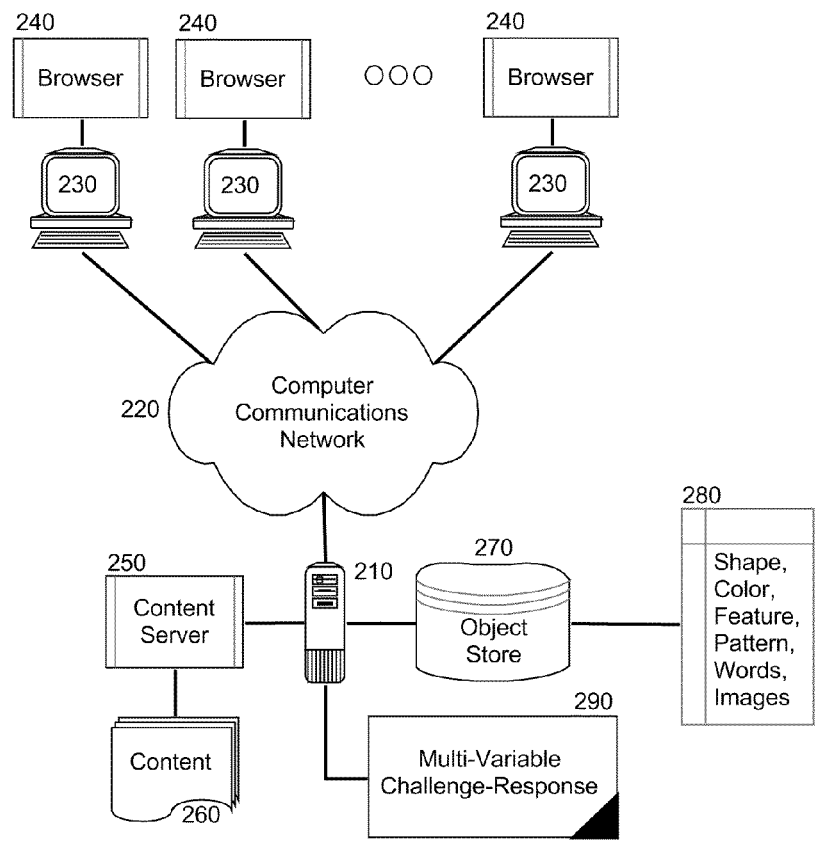
FIG. 2 is a schematic illustration of a content distribution data processing system configured for multi-variable challenge-response; and, FIG. 3 is a flow chart illustrating a process for multi-variable challenge-response.

The process described in connection with FIG. 1 can be implemented within a content distribution system configured to limit access to content to human end users to the exclusion of bots and other autonomously executing computer programs. In further illustration, FIG. 2 is a schematic illustration of a content distribution data processing system configured for multi-variable challenge-response. The system can include a host computing server 210 configured for communicative coupling to different end user computing devices 230 over computer communications network 220. The host computing server 210 can include processor and memory supporting the operation of a content server 250 responding to received requests for content 260 from over the computer communications network 220. Each end user device in turn can include a processor and memory supporting the execution of a content browser 240 through which content 260 can be requested for transmission from the content server 250.

Notably, an object store 270 can be coupled to the host computing server 210 and can include a repository of different objects for inclusion in a challenge-response prompt. The object store 270 further can include a variable selection of different object characteristics 280, such as different shapes, colors, shape features, patterns, words and iconic images, to name a few. Multi-variable challenge-response module 290 can be coupled to the host computing server 210 and can execute in the memory of the host computing server 210 by the processor of the host computing server 210. The multi-variable challenge-response module 290 can include program code enabled upon execution by the processor to formulate and manage multi-variable challenge-response prompts limiting access to the content 260 by the end user computing devices 230 to those operated by human end-users seeking contemporaneous access to the content 260.

More particularly, the program code of the multi-variable challenge-response module 290 can be enabled in response to a request to access the content 260 by an end user device 230 by selecting an object set of multiple different objects from the object store 270 and applying multiple different ones of the object characteristics 280 to the objects in the object set. For example, any combination of different colors, patterns, shape features and decorators can be applied to the objects in the object set. Subsequently, a question can be posed based on the multiple different object characteristics 280 applied to the objects in the object set and an answer can be computed for the question. Thereafter, the program code of the multi-variable challenge-response module 290 can transmit a challenge-response prompt including the object set with the applied object characteristics 280 and the question to the requesting end user device 230. Once a response is received, the program code of the multi-variable challenge-response logic 290 can compare the response to the computed answer and in the event of a match, access can be granted to the requested content 260.

Figure 3:
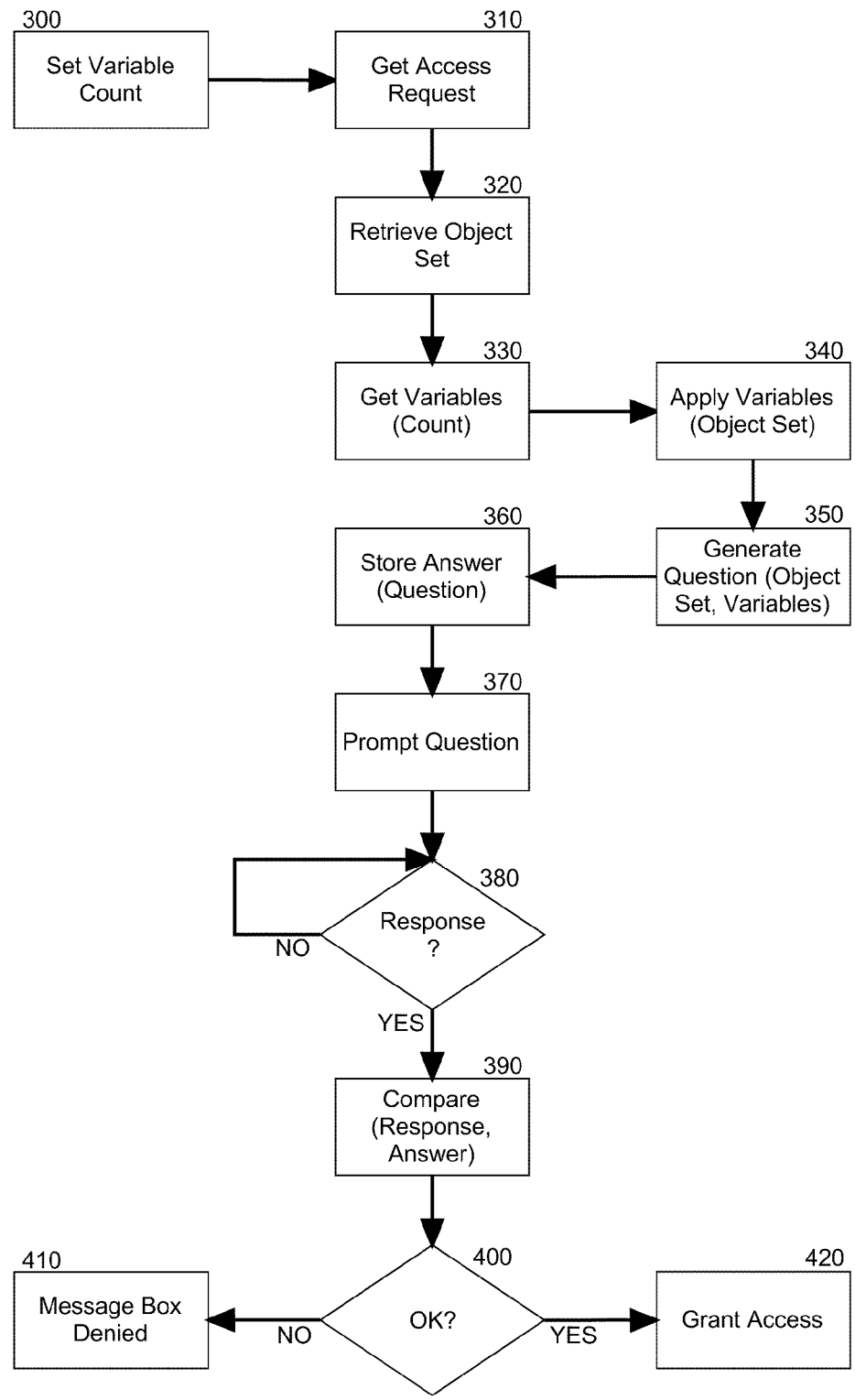

In yet further illustration of the operation of the program code of the multi-variable challenge-response module 290, FIG. 3 is a flow chart illustrating a process for multi-variable challenge-response. Beginning in block 300, a variable count can be established indicating a desired number of different characteristics to be applied to objects in an object set of a challenge-response prompt. In block 310, an access request can be received from a requesting end user computing device. In response to receiving the request, in block 320 an object set can be retrieved from an object store, for example a set of shape images. In block 330, a number of different variable characteristics can be retrieved in accordance with the established variable count. For instance, in the case of a variable count of four (4), each of different colors, different iconic images, different shape features, and different text can be retrieved and applied to the objects in the object set randomly in block 340.

In block 350, a question can be generated for the object set with different characteristics applied. For instance, a listing of the different objects in the object set can be retrieved and each characteristic can be determined for each object. Thereafter, a set of rules can be applied to the listing and determined characteristics to map the listing and determined characteristics to a different predetermined multi-variable question such as "How many [VAR1—Iconic Image Type] are located on the [VAR2—Shape Feature] of the object with the pattern of [VAR3—Pattern]". In block 360, an answer to the question can be computed also by way of the listing and determined characteristics and stored for later retrieval.

In block 370, a challenge-response prompt can be generated to include a display of the object, the question and also an answer field, and transmitted to the requesting end user computing device for display in a content browser executing therein. In decision block 380, when a response is received from the requesting end user computing device, in block 390 the response can be compared to the computed answer. In decision block 400, if the response does not match the computed answer, in block 410 the request to access the content can be denied. Otherwise, in block 420, access to the content can be granted.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for multi-variable challenge-response comprising:
   receiving a request to access content from an end user computing device from over a computer communications network;
   selecting multiple different objects for inclusion in an object set and applying multiple different variable characteristics to each of the selected multiple different objects in the object set;
   generating a question to incorporate the multiple different variable characteristics and computing an answer to the question;
   transmitting a challenge-response prompt to the end user computing device over the computer communications network including the different objects with different variable characteristics applied, and also the generated question;
   receiving a response to the challenge-response prompt and comparing the response to the computed answer; and,
   granting access to the content if the response and computed answer match, but otherwise denying access to the content.

2. The method of claim 1, wherein selecting multiple different objects for inclusion in an object set and applying multiple different variable characteristics to each of the selected multiple different objects in the object set, comprises selecting a plurality of different shapes for inclusion in an object set and applying both a different color and also a different decorator to each of the different shapes.

3. The method of claim 1, wherein selecting multiple different objects for inclusion in an object set and applying multiple different variable characteristics to each of the selected multiple different objects in the object set, comprises selecting a plurality of different shapes for inclusion in an object set and applying both a different pattern and also a different decorator to each of the different shapes.

4. The method of claim 2, wherein each of the decorators is a decorator selected from the group consisting of text and an iconic image.

5. The method of claim 3, wherein each of the decorators is a decorator selected from the group consisting of text and an iconic image.

6. The method of claim 1, wherein at least two of the different objects with multiple different variable characteristics applied are arranged superimposed upon one another.

7. A content distribution data processing system configured for multi-variable challenge-response, the system comprising:
   a host computing server with processor and memory configured for communicative coupling to a plurality of different end user computing devices over a computer communications network; and,
   a multi-variable challenge-response module executing by the processor in the memory of the host computing server, the module comprising code enabled upon execution by the processor to
      select in response to a request for content from an end user computing device from amongst the end user computing devices, a plurality of different objects for inclusion in an object set and to apply multiple different variable characteristics to each of the multiple different objects in the object set, generate a question to incorporate the multiple different variable characteristics and compute an answer to the question, transmit to the end user computing device a challenge-response prompt including the different objects with different variable characteristics applied, and also the generated question, compare a response to the challenge-response prompt to the computed answer, and grant access to the content if the response and computed answer match, but otherwise deny access to the content.

8. The system of claim 7, wherein the different objects in the object set comprises a plurality of different shapes.

9. The system of claim 7, wherein the multiple different variable characteristics comprise different colors and different decorators.

10. The system of claim 7, wherein the multiple different variable characteristics comprise different patterns and different decorators.

11. A computer program product comprising a computer usable storage medium embodying computer usable program code for multi-variable challenge-response, the computer usable program code, when executed by a computer, causes the computer to perform:

receiving a request to access content from an end user computing device from over a computer communications network;

selecting different objects for inclusion in an object set and applying multiple different variable characteristics to each of the selected different objects in the object set;

generating a question to incorporate the multiple different variable characteristics and computing an answer to the question;

transmitting a challenge-response prompt to the end user computing device over the computer communications network including the different objects each with multiple different variable characteristics applied, and also the generated question;

receiving a response to the challenge-response prompt and comparing the response to the computed answer; and, granting access to the content if the response and computed answer match, but otherwise denying access to the content.

12. The computer program product of claim 11, wherein selecting different objects for inclusion in an object set and applying multiple different variable characteristics to each of the selected different objects in the object set, comprises selecting a plurality of different shapes for inclusion in an object set and applying both a different color and also a different decorator to each of the different shapes.

13. The computer program product of claim 11, wherein selecting different objects for inclusion in an object set and applying multiple different variable characteristics to each of the selected different objects in the object set, comprises selecting a plurality of different shapes for inclusion in an object set and applying both a different pattern and also a different decorator to each of the different shapes.

14. The computer program product of claim 12, wherein each of the decorators is a decorator selected from the group consisting of text and an iconic image.

15. The computer program product of claim 13, wherein each of the decorators is a decorator selected from the group consisting of text and an iconic image.

16. The computer program product of claim 11, wherein at least two of the different objects with multiple different variable characteristics applied are arranged superimposed upon one another.

\* \* \* \* \*